United States Patent [19]

Toplosky

[11] Patent Number: 5,020,033

[45] Date of Patent: May 28, 1991

[54] LARGE EDDY BREAK-UP DEVICE FOR TOWED ARRAYS

[75] Inventor: Norman Toplosky, Voluntown, Conn.

[73] Assignee: The United States of America as represented by the Secretary of the Navy, Washington, D.C.

[21] Appl. No.: 590,271

[22] Filed: Sep. 28, 1990

[51] Int. Cl.⁵ .............................................. G01V 1/38
[52] U.S. Cl. ...................................... 367/20; 367/154; 367/106; 174/101.5
[58] Field of Search ...................... 367/16, 17, 20, 106, 367/130, 154, 155, 171; 174/101.5

[56] References Cited

U.S. PATENT DOCUMENTS 3,375,488  3/1968  Bridges et al. ...................... 367/155
4,055,138  10/1977  Klein .................................. 114/244

Primary Examiner—Deborah L. Kyle
Assistant Examiner—J. Woodrow Eldred
Attorney, Agent, or Firm—Michael J. McGowan; Prithvi C. Lall; Michael F. Oglo

[57] ABSTRACT

A large eddy break-up device for towed acoustic arrays for reducing the flow noise due to the (TBL) around the towed array is described. It includes two identical halves, each having a circumferential airfoil and two flat flanges which are used to secure it to a coupling on the towed acoustic array and also to integrate the two halves using fasteners. The circumferential foil interferes with the flow noise and large eddys are broken up into easily dissipating small eddys of higher frequency.

3 Claims, 2 Drawing Sheets

LARGE EDDY BREAK-UP DEVICE FOR TOWED ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to towed acoustic line arrays and more particularly to a device for breaking-up large eddys developed when an acoustic line array is towed in a body of water such as an ocean.

(2) Statement of the Prior Art

When an acoustic line array is towed in a body of water such as an ocean, its sonar system is ambient-noise limited at high frequencies. This means that further self-noise improvements at high frequencies are not possible. However, at low frequencies the sonar system is subject to a variety of undesirable noise mechanisms which, if reduced, would improve the performance of the system. One of the most troublesome low frequency noise sources is the flow noise, i.e., the pressure fluctuations inside the turbulent boundary layer, hereinafter designated as the TBL, about the towed array. It is thus desirable to reduce the flow noise to improve the performance of the sonar system of the towed array. Very little seems to have been done to address this problem although spoiler wings and Large Eddy Break-up Devices (LEBUD) have been investigated for drag reduction and stability of flat plates.

SUMMARY OF THE INVENTION

The objects and advantages of subject invention are accomplished by using a Towed Array Large Eddy Break-Up Device, hereinafter called TALEBUD, according to the teachings of subject invention. This device is a passive device like a spoiler wing and is designed to manipulate the frequency spectrum of the flow noise about the towed array. The low frequency flow noise is converted into high frequency flow noise components which are then dissipated quickly due to the viscosity of water. Consequently, a TALEBUD which is basically a concentric spoiler wing, interferes with the flow noise and thus converts some of the low frequency noise into high frequency noise which is readily dissipated in the water. This device is a passive concentric wing mounted around the towed array. The size of the concentric wings changes, i.e., it becomes larger and larger as the TBL becomes thicker and thicker as one goes farther and farther away from the front of the towed array (the towed end) to the back thereof.

An object of subject invention is to have a simple and effective device for breaking up large eddys developed due to the TBL around the towed array.

Another object of subject invention is to convert the low frequency component of the flow noise around the towed array to high frequency components.

Still another object of subject invention is to convert large eddys into easily dissipating small eddys around the towed array.

Other objects, advantages and novel features of the invention will become apparent from the following detailed description thereof when considered in conjunction with the accompanying drawings wherein:

DESCRIPTION OF THE PREFERRED EMBODIMENT

Figure 1:
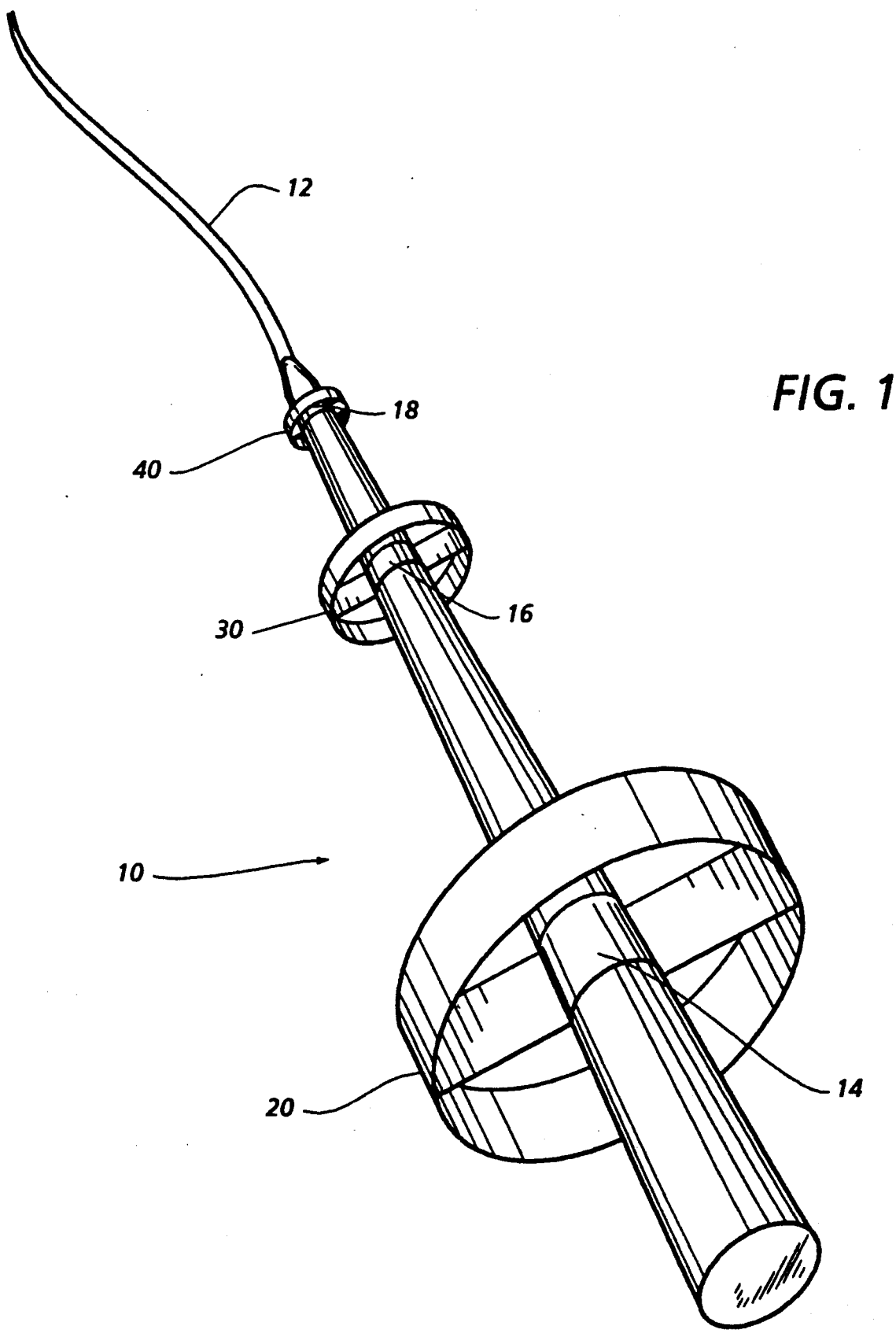
FIG. 1 is a perspective view of a TALEBUD built according to the teachings of subject invention.

Referring now to FIG. 1, there is shown an acoustic towed array 10 being towed by means of tow cable 12. The towed array has a plurality of couplings where TALEBUDS such as 20, 30 and 40 are secured to towed array by already existing couplings at those points. TALEBUDS 20, 30 and 40 are similar in structure except the size which is determined by the anticipated thickness of the TBL at locations or positions 14, 16 and 18, respectively around the towed acoustic array. Consequently, the structure of one of the spoiler wings 20, 30 and 40 will be described.

Figure 2:
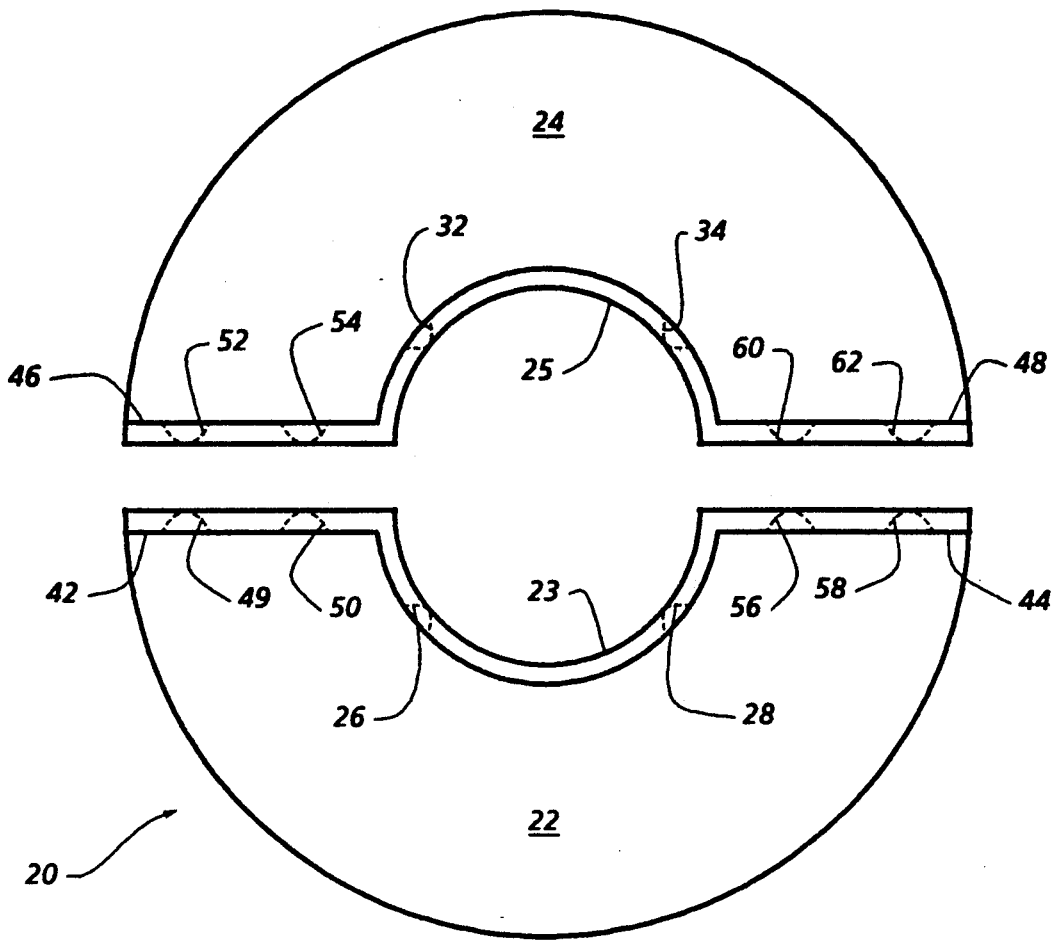
FIG. 2 is a cross-sectional side view of one of the typical components, i.e. spoiler wing, for the device of FIG. 1.
Figure 3:
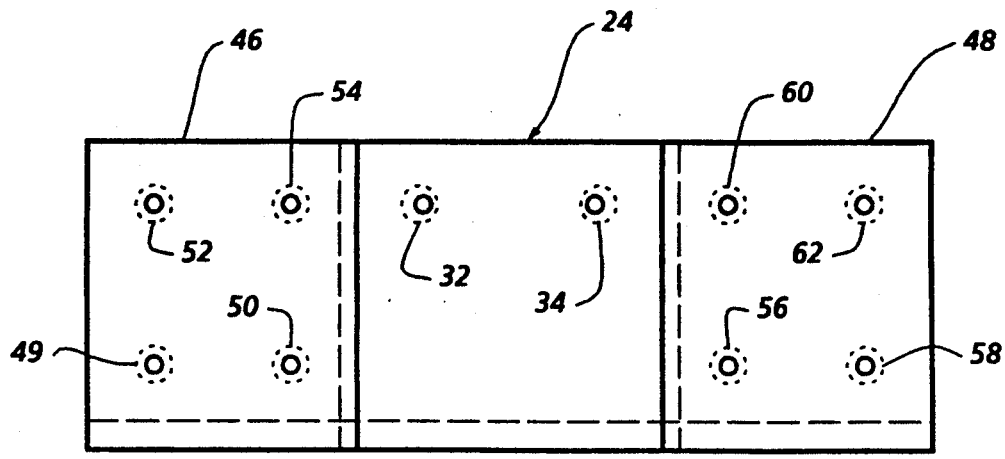
FIG. 3 is a top view of one of the typical components, i.e., spoiler wing of the device.

FIG. 2 is a cross-sectional view of a TALEBUD such as 20. It includes two identical halves 22 and 24 of TALEBUD 20 which are secured to the coupling located at position 14 on the towed array 10 by means of fasteners 26 and 28 and 32 and 34, respectively. Any strong fastener such as a screw into a threaded hole will be used to preserve the integrity of the TALEBUDS and their connection to the towed array via couplings on the towed array. The flanges 42 and 44 for half 22 and flanges 46 and 48 for half 24 are secured together by means of fasteners mating at positions 49, 50, 56 and 58 on flanges 40 and 42 of TALEBUD half 22 with corresponding positions 52, 54, 60 and 62 on flanges 46 and 48 of TALEBUD half 24. FIG. 3 is a top view of TALEBUD 20 with various elements numbered consistent with FIGS. 1 and 2. Non-lift generating circumferential airfoil halves 23 and 25 are part of TALEBUD halves 22 and 24, respectively. The dashed horizontal line in FIG. 3 shows a slant between the ends of the inner and the outer surfaces of Talebud 24.

In operation, the TALEBUDS 20, 30, 40 installed on the towed array 10, interfere with the TBL, breaking up the large eddys and thus converting a portion of the low frequency flow noise as a result of the TBL to smaller eddys of higher frequency. The smaller eddys being the high frequency portion of the flow noise which are dissipated as a result of the viscosity of the water.

Briefly stated, TALEBUDS, according to the teachings of subject invention, are installed to the couplings used for interconnecting various sections of the towed acoustic array. Each TALEBUD includes two identical halves which are coupled together and then secured to one of the couplings on the towed array using fasteners, and thus providing a circumferential airfoil which interferes with large eddys due to the TBL.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be 12 practiced otherwise than as specifically described.

What is claimed is:

1. A large eddy break-up device for a towed array having a plurality of sections interconnected by a plurality of couplings using one member of said plurality of couplings at each of a plurality of junction points and a plurality of spoiler wings of similar structure secured to said towed array at each of said plurality of junction points using a corresponding member of said plurality of couplings, each member of said plurality of spoiler wings comprises:

a first half of said spoiler wings and a second half of said spoiler wing wherein each said first and second halves having a pair of radial flat flanges, and semi-circular airfoils in between said pair of flanges;

means for securing said pair of flat flanges on said first half of said spoiler wing with the corresponding pair of flat flanges on said second half of said spoiler wing and thus forming a circular airfoil; and means for securing said plurality of spoiler wings to a corresponding member said plurality of couplings interconnecting various sections of the towed array.

2. The large eddy break-up device of claim 1 wherein said means for securing said pair of flat flanges on said first half of said one with the corresponding pair of flat flanges on said second half of said unit includes a first plurality of fasteners.

3. The large break-up device of claim 1 wherein said means for securing said plurality of units to a corresponding member of said plurality of couplings interconnecting various sections of the towed array includes a second plurality of fasteners.

* * * * *